US006230636B1

(12) United States Patent
Bom et al.

(10) Patent No.: US 6,230,636 B1
(45) Date of Patent: May 15, 2001

(54) AGRICULTURAL MACHINE

(75) Inventors: Cornelis Johannes Gerardus Bom, Rozenburg; Adrianus Petrus Maria Brabander, Naaldwijk, both of (NL)

(73) Assignee: Maasland N.V., Maasland (NL)

( * ) Notice: Subject to any disclaimer, the term of this patent is extended or adjusted under 35 U.S.C. 154(b) by 0 days.

(21) Appl. No.: 09/103,720

(22) Filed: Jun. 24, 1998

(30) Foreign Application Priority Data

Oct. 25, 1996 (NL) .................................................. 1004361
Jan. 16, 1997 (NL) .................................................. 1005026
Oct. 20, 1997 (NL) .................................... PCT/NL97/00585

(51) Int. Cl.$^7$ ........................................................ A01C 7/08
(52) U.S. Cl. ............................... 111/13; 111/63; 111/174; 172/518; 172/445.1; 172/449; 172/810
(58) Field of Search ..................................... 172/518, 538, 172/539, 540, 519, 439, 445.1, 449, 677, 605, 297, 810; 111/13, 63, 55, 174, 130, 8; 280/460.1, 461.1

(56) References Cited

U.S. PATENT DOCUMENTS

| 3,810,434 | * | 5/1974 | Van Der Lely et al. | .......... | 172/59 X |
| 4,034,687 | * | 7/1977 | Van Der Lely | ................... | 172/518 X |
| 4,058,068 | * | 11/1977 | Van Der Lely et al. | .......... | 172/59 X |
| 4,121,774 | * | 10/1978 | Van Der Lely et al. | ............ | 239/664 |
| 4,157,877 | * | 6/1979 | Lee | .................................... | 172/518 X |
| 4,193,710 | * | 3/1980 | Pietrowski | ........................ | 172/518 X |
| 4,302,129 | * | 11/1981 | Arenz | ..................................... | 172/540 |
| 4,533,000 | * | 8/1985 | Van Der Lely | .................. | 172/540 X |
| 5,494,375 | * | 2/1996 | Yates | ................................. | 172/518 X |

* cited by examiner

Primary Examiner—Victor Batson
(74) Attorney, Agent, or Firm—Penrose Lucas Albright

(57) ABSTRACT

Disclosed is a cultivator mounted to roll about a horizontal axis transverse to the direction of travel of the machine in combination with a hopper. The cultivator and hopper are mounted on a frame which is adapted to be connected to a three-point hitch of a tractor. The cultivator is connected to the frame under and behind the hopper and by a pivotal shaft which interconnects bearings confined fore and aft by U-profiles. The cutivator is thus tiltable within limits relative to the frame and hopper and is also turnable within limits so that the cultivator turns with the tractor. It also provides support for the hopper. A centrifugal air pump is mounted on the hopper which, via a pair of venturi-type devices, draw in granular material, such as seed, from the hopper for distributing same on the soil, the hopper having a pair of metering devices which meter granular material received by the venturi-devices. The venturi-type devices are mounted at the bottom of the metering devices to be hingeably or slidably removable so that granular material can be collected in buckets or the like directly from the metering devices to ascertain the rate that granular material is being dispensed by the metering devices.

53 Claims, 7 Drawing Sheets

AGRICULTURAL MACHINE

FIELD OF THE INVENTION

The present invention relates to an agricultural machine, in particular a soil cultivating machine, such as a seed drill whether or not combined with a cultivator, which is provided with a supporting implement for coupling to the front lifting hitch of a tractor, the implement, for the purpose of being supported on the ground being provided with a roller that is connected with a frame.

BACKGROUND OF THE INVENTION

Such machines are generally known, They are intended for further crumbling soil which has been previously worked, usually by plowing, at least in the upper part of the worked soil layer. As primary cultivation has particularly for its object to turn the upper soil layer, the latter is usually broken up roughly and contact with the soil layer which has not been touched is considerably reduced. Known machines are intended to press the primarily cultivated soil, prior to crumbling, in such a manner that the contact between soil which has been turned and soil which has not been touched is established at least to some extent. This contact is required for the growth of plants in view of the capillary supply of water from relatively deep soil layers. During pressing, considerable forces may occur in the frame of the machine or in the connection thereof with the tractor. This often leads to a relatively heavy construction of the frame. The present invention has for its object to provide a construction in which such forces are avoided or act on the frame construction to a lesser degree.

SUMMARY OP THE INVENTION

In accordance with the invention, the above objective is achieved when suitable supporting means and are provided between the frame and the roller for a mutual pivoting movement about an imaginary or real axis which is orientated in the direction of travel. With such a construction it is usually possible for the roller to follow unevenness in the field without torsion forces occurring between the tractor and the frame or in the frame itself. The construction also facilitates the movement of the tractor during operation. Moreover, by avoiding to a significant extent torsion forces occurring in the implement, a relatively lighter and consequently cheaper construction of the frame is possible.

In a favorable embodiment, the supporting means comprise a real pivotal axis, at the ends of which roller bearings are provided, which roller bearings are included in the frame with little clearance between an upper and a lower horizontal guide face. In an alternative embodiment, the frame is supported on the roller via at least two spring elements, such as compression springs or shock absorbers, whether or not hydraulic ones, each disposed on a lateral side outside the transverse center of the roller.

According to a further aspect of the invention, the pushing forces of the tractor are transferred to the roller via the frame of the implement by means of arms arranged between the frame and the roller construction, which arms, at connecting points, are provided with ball-and-socket joints. In accordance with the invention, in view of the forward movement of the roller, the arms may be included in the machine both in a pushing and in a pulling position.

A further particular aspect of the invention relates to an implement in which such arms extend for the greater part above the roller, substantially horizontally, and from the frame towards the roller while having a downward directional component. Such a machine is compact in height in the direction of travel, so that maneuvering the machine is facilitated and the center of gravity is located close to the tractor.

The present invention is particularly advantageous when the agricultural machine is constituted by a combination of a cultivator and a sowing or broadcasting machine having a hopper which is supported on the frame of the implement. With such an agricultural machine, by means of the construction according to the present invention, an advantage is obtained that in case of a local unevenness or a local slope in the soil surface, the frame and hopper are able to maintain their position relative to the lifting hitch of the tractor. In particular, when the hopper is completely filled, this has the advantage that no additional forces as a result of tilting of the hopper will occur in the construction.

The invention furthermore comprises a construction in which a centrifugal air pump is arranged in the immediate vicinity of the trestle of the implement, the drive shaft thereof being orientated in the direction of travel and the shaft of the centrifugal air pump, via transmission means, being in driving connection with a drive shaft which is located in the transverse center of the implement. Such a construction is very compact and advantageous because of the possibility of a relatively short and simple transmission via a universal joint shaft which is connected to the front power take-off shaft of a tractor.

The invention further comprises an agricultural machine including a metering device, the discharge opening of which is released by means of a sliding device, e.g. for testing purposes.

BRIEF DESCRIPTION OF THE DRAWINGS

For a better understanding, the invention will further be described with reference to the accompanying drawings, in which.

Corresponding elements in the drawings are indicated by the same reference numerals. The invention is not, however, restricted to the embodiments shown and described which illustrate the invention conceptively as well as to meet the written descriptive requirements of 35 U.S.C. §112.

DETAILED DESCRIPTION OF THE PREFERRED EMBODIMENTS

Figure 1:
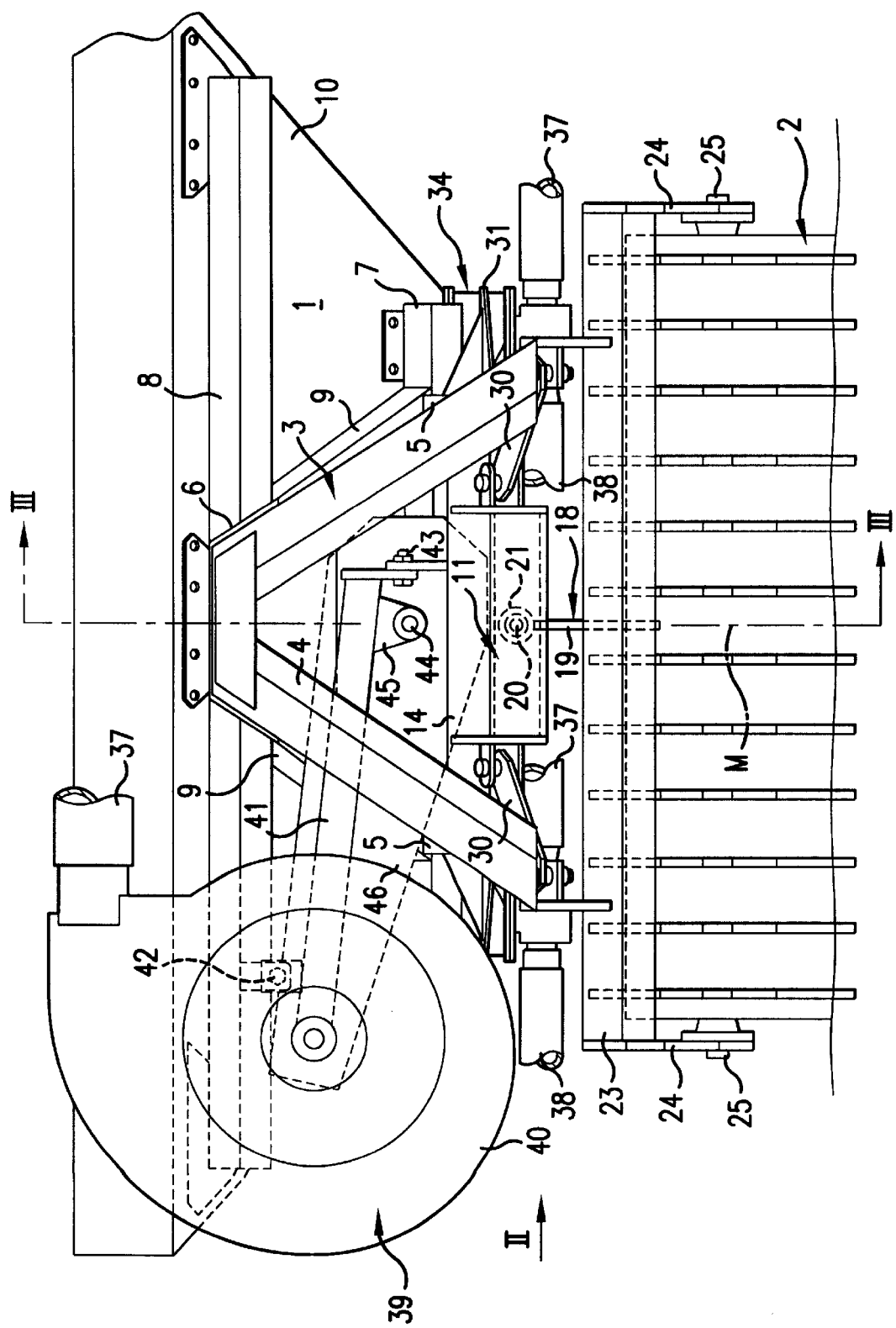
FIG. 1 is a rear elevational view of an implement relating to an agricultural machine according to the invention.
Figure 2:
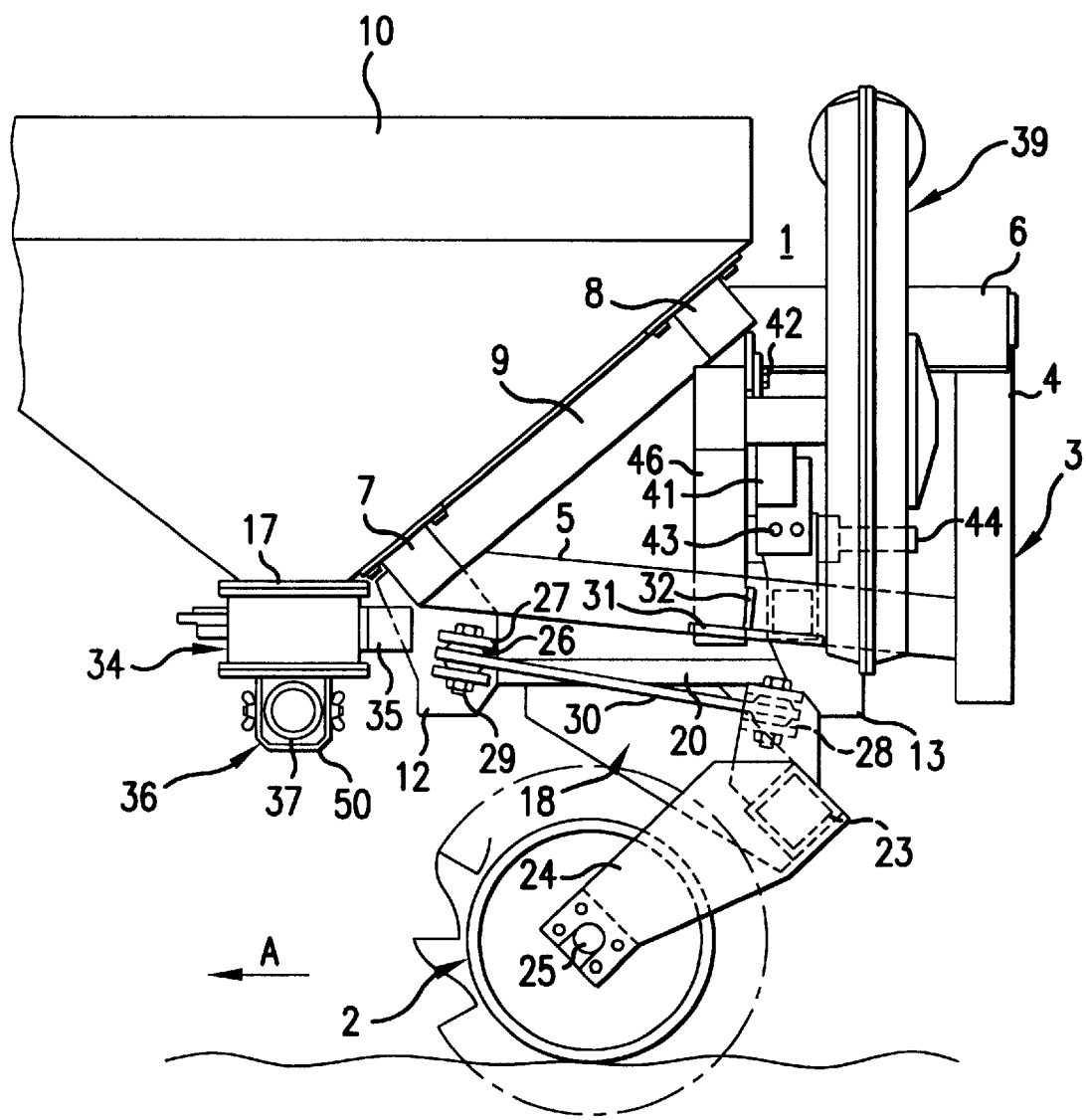
FIG. 2 is a side view of the implement of FIG. 1 as seen from the direction of arrow II of FIG. 1.
Figure 3:
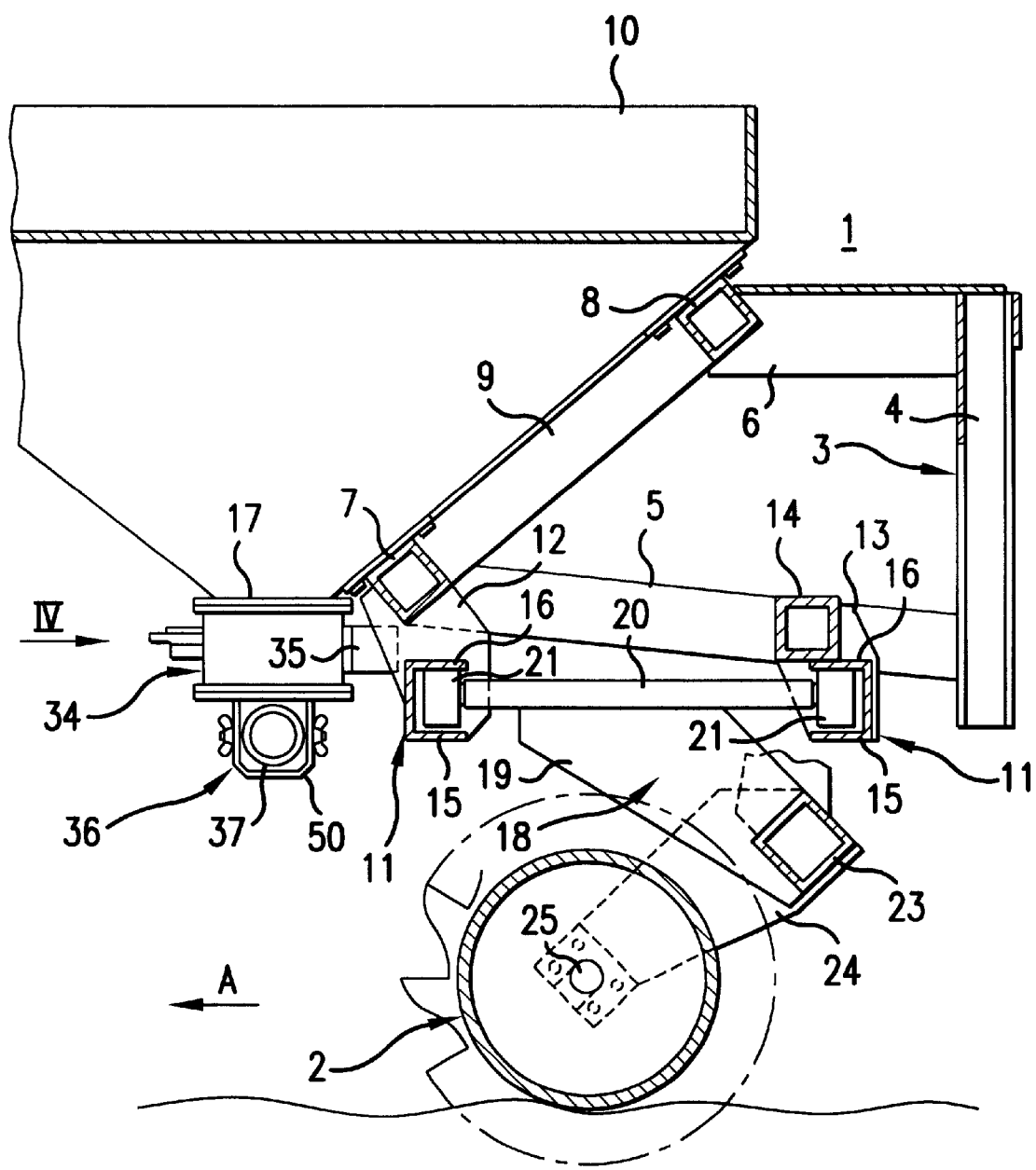
FIG. 3 is a vertical cross-sectional view taken on line III—III in FIG. 1, which line coincides with an imaginary center plane M of the machine.
Figure 7:
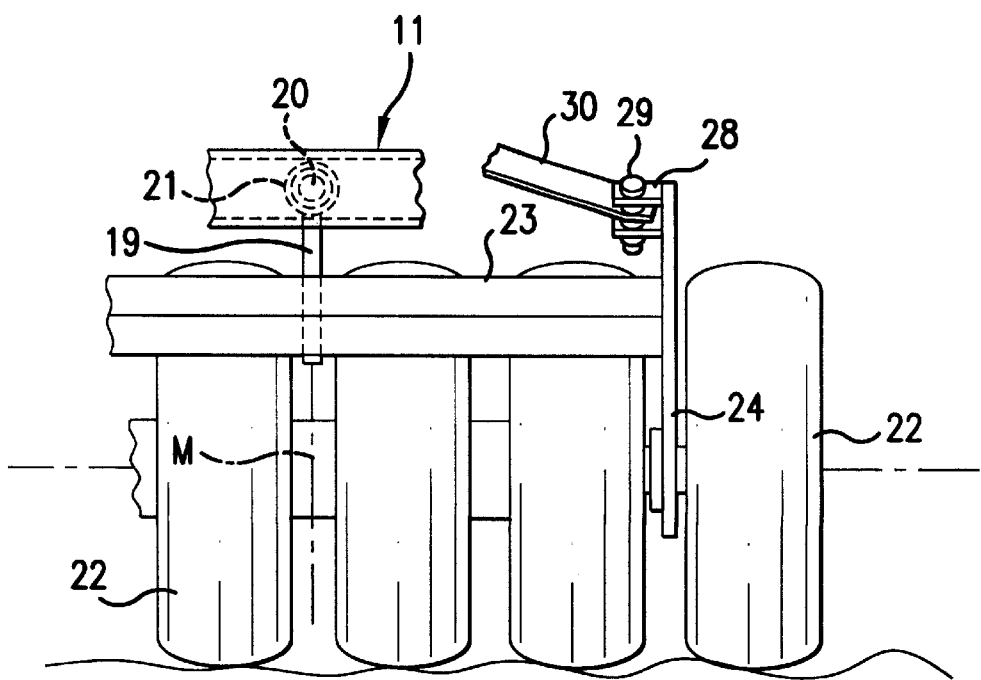
FIG. 7 is a partial front elevational view of a second alternative embodiment of the implement.

FIG. 1 shows an implement 1 supported on the ground via a roller 2. Implement 1 constitutes parts of an agricultural machine, in the present embodiment a machine for broadcasting granular material, such as a seed drill or a fertilizer broadcaster. For that purpose, in this embodiment, the implement is provided with a hopper 10. Roller 2 and hopper 10 are interconnected via a frame 3. Implement 1 is intended for coupling to the front lifting hitch of a tractor. To that end, implement 1 comprises a trestle 4 provided with required coupling means which are well known in the art. The shown trestle 4 is a so-called quick-coupling trestle. Frame 3 comprises a pair of lower girders 5 and an upper girder 6, extending substantially horizontally and forwardly from trestle 4. Upper girder 6 is designed in this case as a plate part which, in a cross-sectional view, is bent into an inverted V-shape and the lower girders 5 are designed as hollow right-angled profiles. The longitudinal girders 5 and 6 are coupled near their front ends with a framework consisting of a lower transverse girder 7 and an upper transverse girder 8, which are intercoupled by a pair of struts 9 converging in upward direction. The framework is included in the frame at an angle of approximately forty-five degrees for a proper abutment and proper connection with the rear wall of hopper 10 which is V-shaped in side view. Hopper 10, which has a shape well known, as such, in the art comprises a larger lower part including two right-angled funnel-shaped portions the inner side walls of which, extending in the direction of travel A, are interconnected at least near their upper edges. Below the lower longitudinal girders 5, frame 3 is provided with two horizontal U-sections 11 extending transversely to the direction of travel and facing each other with their open sides. The foremost one of these U-sections 11 is located substantially over the front boundary of roller 2 and is connected with the lower transverse girder 7 via supporting lugs 12 closing off the ends of the U-sections. In an analogous manner, via supporting lugs 13, the rearmost U-section 11 is connected with a cross-beam 14 provided between the lower longitudinal girders 5. The legs 15 and 16 of the U-sections 11 extend horizontally. U-sections 11 are both included in implement 1 at the same level. Roller 2 is supported against U-sections 11 inter alia via a central support 18. For this purpose roller 2 comprises a supporting element 19, which, in the present embodiment, is designed as a single, vertically arranged plate. On the upper side of element 19 are axle portions 20 extending transversely relative to the lateral disposition of roller 2 to be received between lower legs 15 and upper legs 16 of U-sections 11. At the forward and aft ends of axle portions 20, substantially between lower leg 15 and upper leg 16 of each U-section 11, fitting bearings 21 are received. In the embodiment shown, the front and the rear axle portions 20 together constitute an integral whole that reinforces supporting element 19, which is plate-shaped in the present embodiment. For that purpose the central portion is thicker than the end portions on which bearings 21 are disposed. In an embodiment (not shown) supporting element 19 is constituted by two plate parts disposed in an inverted V-shaped arrangement. In side view, such a supporting element 19 has a substantially triangular shape, the rear and lower angle of which coincides with a horizontal cross-beam 23 of the roller frame. Cross-beam 23 is in an imaginary plane outside the upper and rear quadrant of roller 2, and is connected with the axle shaft 25 of roller 2 via roller frame portions 24 extending towards the axle of shaft 25. According to the invention, any roller may be applied. The embodiment shown in FIG. 1 comprises a packer roller, whereas FIG. 7 shows an embodiment comprising a so-called segment roller. In the preferred embodiment of FIG. 7 comprising roller segments 22, in this case in the form of tires, frame portions 24 extend between segments 22 towards the axis of shaft 25. In an embodiment in the form of a packer roller, i.e. a roller having a closed cylinder circumferential wall on which there are provided protrusions, frame portions 24 are disposed at the ends of roller 2.

Roller 2 is furthermore connected with frame 3 of implement 1 via a quadrangle hinge construction having substantially upwardly directed pivotal threaded studs 29. To this end, in the present embodiment on the outside of supporting lugs 12, frame 3 is provided with pairs of lugs 27 in which there may be included a pivotal stud 29 at an angle of approximately fifteen degrees upward and rearward as well as upward and sideward. In an analogous manner, the roller frame comprising cross-beams 23 and frame portion 24 is provided with pairs of lugs 28, e.g. disposed on the inside of a roller frame portion 24. Between each foremost pair of lugs 27 and each rearmost pair of lugs 28 provided on the relevant side of the machine, extends a connecting arm 30. Near its two ends, arm 30 is coupled with the pivotal stud 29 via a ball-and-socket joint 26. The two arms 30 extend downwardly in rearward direction, which enables a mutual pivoting movement of frame 3 and roller 2 about the pivotal axle 20; the front sides of the arms have a fixed position just below frame 3, whereas the rear ends of arms 30 have to be located at some distance from the frame to be able to pivot along with roller 2. This construction favors the compactness of the implement and forms a separate subject of the invention. For limiting the mutual pivotability, frame 3 is provided with stops 31 constituted by plate parts which extend from a lower longitudinal girder 5 in outward direction and which are reinforced by means of at least one rib 32. Stop 31 being made of plate material ensures the arrest of a rear pivotal stud 29 whereby movement of roller 2 relative to frame 3 is thus limited.

The function of the machine is as follows:

During operation, frame 3 is pushed forward by the front lifting hitch of a tractor and the lifting hitch is fixed in a position in which the weight of the front side of the tractor, and that of implement 1, is distributed over roller 2 and the front wheels of the tractor. In particular, when for example after a primary soil cultivation, such as plowing, the soil is crumbled in a secondary working run by means of a rotary harrow to a depth which is, for cereal crop, usually relatively shallow, this results in the lower layer of primarily cultivated soil being properly forced against the uncultivated underlayer for the purposes of capillary supply of water. Nevertheless, for example when the primary objective is to support the weight of implement 1 including hopper 10 only to a minimum extent on the ground via the tractor, it is possible to fix the lifting hitch of the tractor in a floating position.

The specific supporting means in the machine, constituted by guide faces 15 and 16, axle 20, bearings 21 and the quadrangle hinge construction 29 and 30, enables in a favorable manner a simultaneous pivoting movement of roller 2 relative to frame 3 about an imaginary vertical pivotal axis when steering the front tractor wheels. Such a construction facilitates the steering of the tractor-machine combination during operation, in particular when the latter comprises a soil cultivating implement, such as the combination of a rotary harrow or cultivator with a seed drill.

During operation, roller 2 adapts itself to unevenness in the soil surface by pivoting about the horizontal axle 20, which pivotal movement is also allowed by means of the ball-and-socket joint construction 26 near pivotal studs 29 of connecting arms 30. In view of an ample fitting in the connecting points of the quadrangle hinge construction, which also allows a mutual pivotability of roller 2 and frame 1, a ball-and-socket joint 26 has the advantage that bearings 21 are positioned exactly relative to the guide faces 15 and 16, thus enabling a minimum width thereof. In a more expensive embodiment, guide faces 15 and 16 provide a curved path equal to the curve defined by the quadrangle hinge construction. The construction shown which comprises a standard U-section 11 having relatively wide legs 15 and 16 has the advantage, however, of being produced in a quick and cheaper manner. The pushing force of the tractor is substantially transferred to roller 2 via steering arms 30, while the two bearings 21 and supporting element 19 ensure a fixed and correct position of roller 2. Due to the indicated position of bearings 21, both the foremost and the rearmost bearing 21 bear against the upper guide face 16 during operation. Upon lifting the machine, bearings 21 rest on the lower guide faces 15. In an alternative for guide faces 15, a support 18 is suspended in frame 3 by means of one or more flexible connecting elements, such as chains. The position of bearings 21 relative to roller 2 also constitutes a favorable compromise between the moments occurring when implement 1 is being supported on the one hand, and the magnitude of the curve described by bearings 21 when roller 2 is being operated on the other hand. The mutual pivotability of roller 2 and frame portion 3 has the advantage that torsion forces, occurring during operation in implement 1 and in the connection thereof with the tractor, are limited.

In the specific embodiment of the invention in which implement 1 constitutes parts of an agricultural machine designed as a sowing or broadcasting machine, implement 1 is provided with a hopper 10 including metering devices 34 connected to the outlets thereof. Said metering devices 34, driven by means of an electromotor 35, supply the metered sowing seed to a venturi-device 36 by means of which the metered seed is fed to an air current for the purpose of transport to sowing or broadcasting elements.

Figure 4:
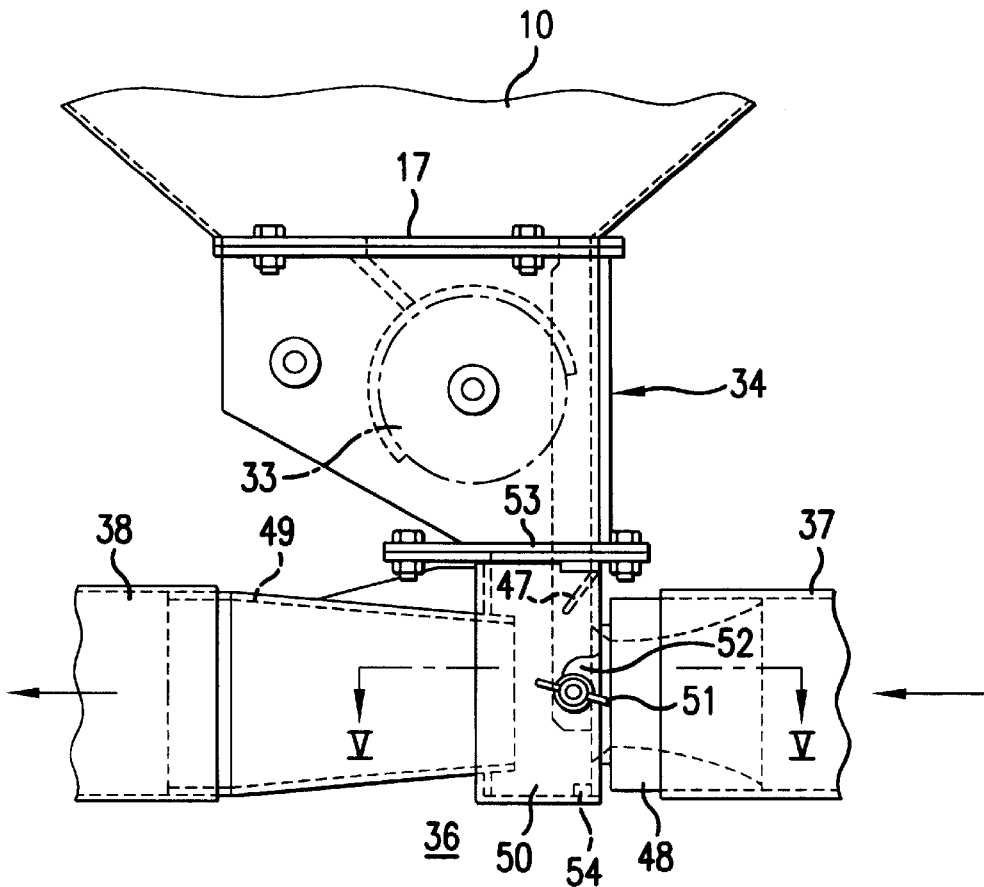
FIG. 4 is a fragmentary view of part of the implement according to the arrow IV in FIG. 3.
Figure 5:
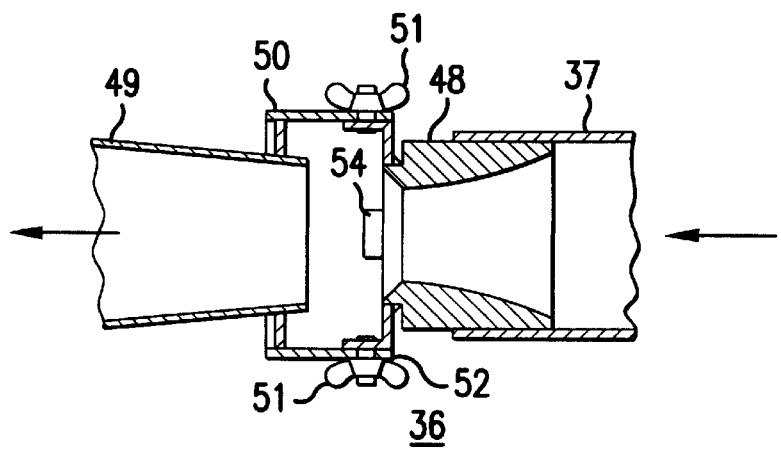
FIG. 5 is a cross-sectional view taken on line V—V in FIG. 4.

FIG. 4 shows a metering wheel 33 and a rebound plate 47, via which metered seed is fed to an air current supplied via supply hose 37 and accelerated by means of a venturi-element 48. The air-seed mixture is supplied via discharge hose 38 to a sowing or broadcasting unit (not shown). The discharge hose 38 is connected to a discharge cone 49 constituting part of the venturi-device 36. The supply opening of discharge cone 49 is located at some distance from the discharge opening of venturi-element 48 in a housing 50 which constitutes partially a unit with discharge cone 49. The housing portion connected with discharge cone 49 is capable of being removed via clamping elements 51 from the housing portion which is connected with venturi-element 48, after detaching the clamping elements 51 and after displacement of the housing portion connected with discharge cone 49 through a right-angled open slotted hole 52. The housing portion connected with venturi-element 48 is rigidly connected to metering device 34 by means of clamping elements disposed at the points 53. For the purpose of a correct mutual positioning of the housing portions, the detachable housing portion is provided with a stop 54 disposed on a bottom of housing 50. The release of the discharge opening of metering device 34 as above described provides means for a simple calibration of metering device 34.

Figure 6:
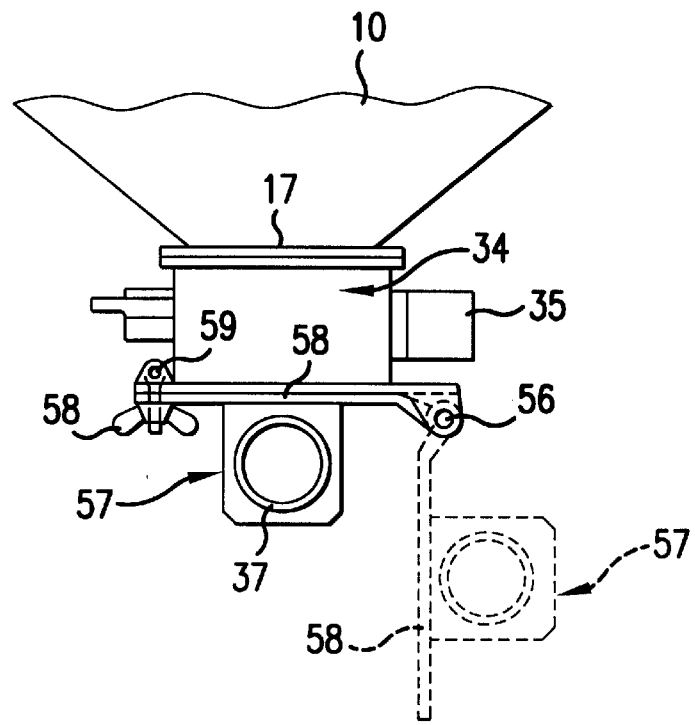
FIG. 6 is a side view of a part of the implement according to FIG. 2 in an alternative embodiment.

FIG. 6 shows an alternative construction for the release of said opening with the aid of a horizontally disposed pivotal hinge 56. For this purpose, in an alternative construction, a venturi-element 57 is provided with a flange 58 which is pivotable on one side about a horizontal pivotal axis 56, orientated transversely to the direction of travel, relative to a flange disposed on metering device 34. During operation, venturi-element 57 is capable of being fixed to metering device 34 by means of flange 58 operating as a clamping element which can be pivoted from a clamping position about a pivotal hinge 59, which is also disposed horizontally and transversely to the direction of travel. The alternative construction 57 has the advantage that the release can be effected quickly and without the risk of contamination of a venturi-portion and that a correct and quick mutual positioning of metering device 34 and a venturi-device 57 is guaranteed.

For generating the air current that transports the metered seed, the machine is provided with a centrifugal air pump which is part of an air supply unit 39 including a carrier beam 41 on which air pump 40 is arranged. Carrier beam 41 extends transversely to the drive shaft of air pump 40, which, with an outer end and near its drive shaft, is connected by a fastening member 42 via lugs, with the upper transverse girder 8 and, at the other end near the vertical imaginary center plane M of the machine extending in the direction of travel, is connected by fastening means 43, also via lugs, with cross-beam 14. Air supply unit 39 is operatively connected to a bearing supported drive shaft 44 which intersects the said center plane M of the machine and which is connected via a support 45 with carrier beam 41. Via a grooved end, drive shaft 44 is capable of being coupled with a universal joint shaft for being driven from the front power take-off shaft of a tractor. In a stable initial position, drive shaft 44 is located over pivotal axis 20. Via driving wheels accommodated in a guard element 46 and one or more endless drive elements, preferably V-belts, disposed therebetween, drive shaft 44 is in a driving connection with air supply unit 40. Carrier beam 41 has such dimensions that air supply unit 40 can be arranged on a lateral side of the coupling trestle 4, even when the dimensions of air supply unit 40 are relatively large, i.e., having approximately the same height as coupling trestle 4. This has the advantage that, when the drive shaft of air pump 40 and the drive shaft 44 are orientated in the direction of travel A, the most rearwardly located tangents of air pump 40 and coupling trestle 4, extending transversely to the direction of travel, can coincide, thus placing air pump 40 at a minimum distance from the center of gravity of implement 1 and that of the tractor. Nevertheless, the shown construction provides a simple and effective drive of air pump 40. Air pump 40 delivers air, drawn in via a central opening covered with gauze, into and through a flexible line 37, which is split via at least one T-piece (not shown), to the venturi-devices 36 or 57. According to a preferred embodiment, the venturi-devices 36 or 57 are mounted in the machine so as to extend horizontally and transversely to the direction of travel A and debouch into conveyor hoses 38, which extend along the tractor in rearward direction and debouch into a sowing or broadcasting unit included in the machine.

Figure 8:
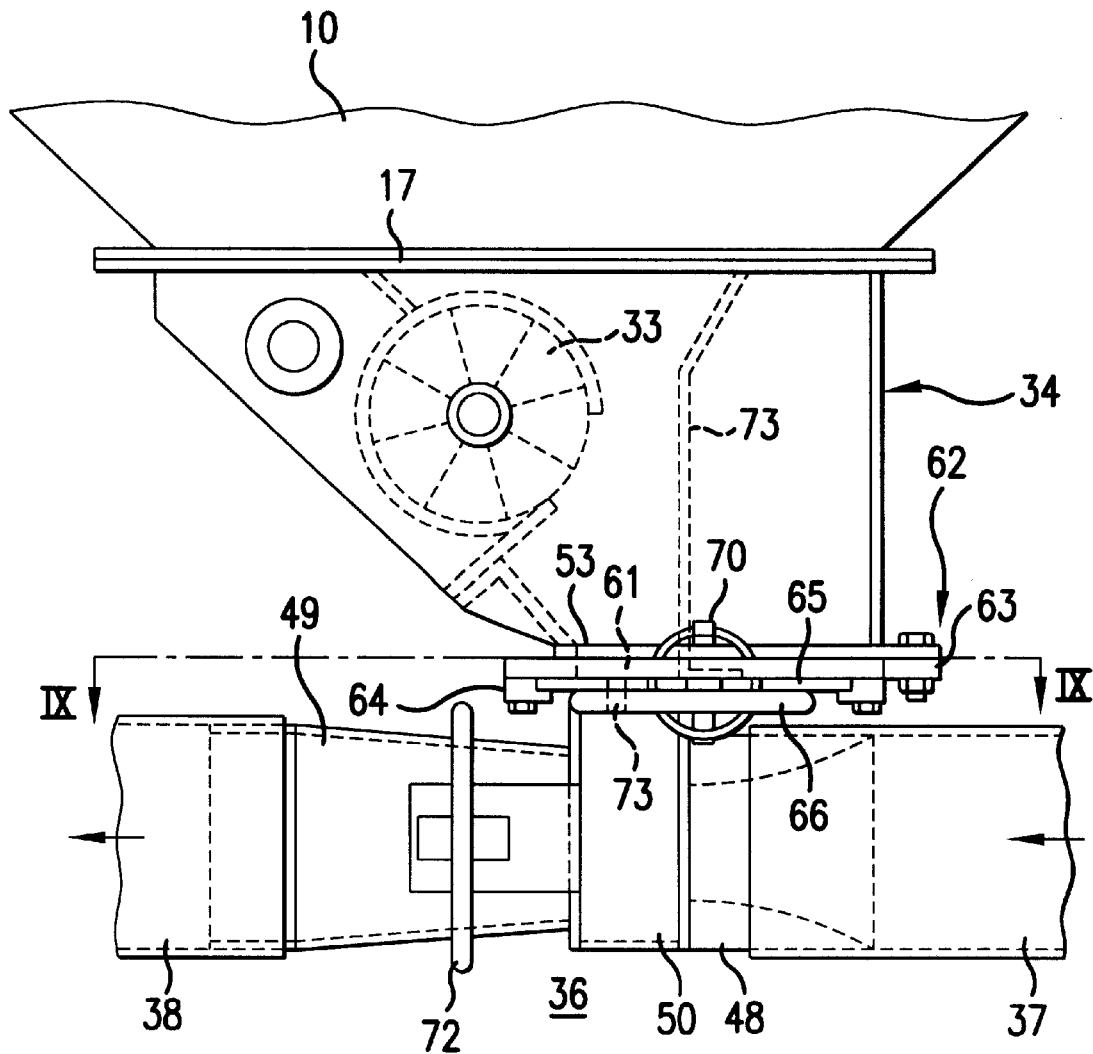
FIG. 8 is a front elevational view of part of the machine which shows a third alternative embodiment of the implement.
Figure 9:
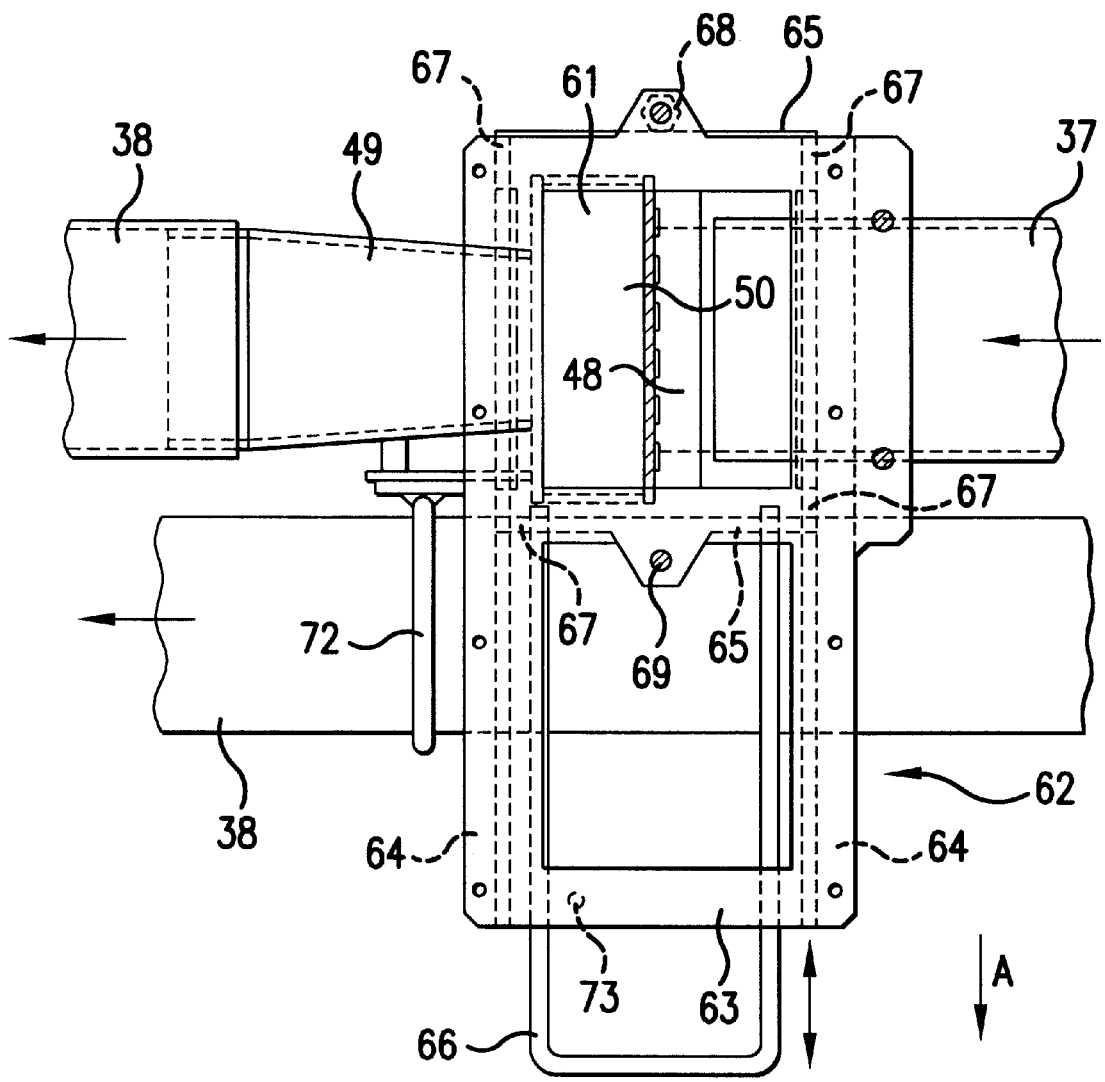
FIG. 9 is a cross-sectional view taken on a line IX—IX in FIG. 8.

FIGS. 8 and 9 illustrate a second alternative construction for releasing a discharge opening 61 of a metering device 34 which is known, per se, for e.g. a test. By means of a test the metered quantity of seed is calibrated at a given number of revolutions of the metering wheel 33. The metering wheel 33 constitutes part of the metering device 34. During the rotating movement, the metering wheel 33 picks up seed between its radial blades, which seed falls down in the direction of opening 61 which provides access to a venturi-device such as venturi-device 36 described above.

FIG. 8 shows in a front view the left one of at least two discharge openings in hopper 10. In the present embodiment, housing 50 of venturi-device 36 is not detachable and venturi-device 36 is connected with the slidable portion of a sliding device 62. Sliding device 62 comprises a fastening plate 63, which is provided near its lower side with guide strips 64 made of synthetic material, and a recess in which a slide 65, which may be composed of metal plate material, is capable of being guided. Slide 65 is provided with a handle 66 and bears preferably with only four ridge-shaped protrusions 67 on the recesses in guide strips 64 constituting a straight guide means for slide 65. The recess in the guide strips preferably equals the thickness of the material of which slide 65 is made. Near the rear side fastening plate 63 is provided with a rear lug 68 at the lower side of which is a stop for the slide 65, e.g., in the form of a nut and bolt connection or lug 68 may constitute a stop itself by being bent over 90° in a downward direction. Both slide 65 and fastening plate 63 are provided with an aperture which equals opening 61 in metering device 34. More in particular slide 65 and fastening plate 63 may be designed as rectangular frameworks composed of plate material. Halfway along the framework of the carrier is disposed a transverse connecting means including an opening 69 through which a locking pin can be passed for locking slide 65 into its operative position by means of a locking pin 70. Near its front end fastening plate 63 is provided with a foremost stop 73 which prevents slide 65 from being pulled from straight guide means 64 when releasing discharge opening 61.

The length of fastening plate 63 and guide strips 64 is double the length of slide 65. Thus proper guiding or support is obtained upon moving fastening plate 63 between the operative and inoperative positions relative to the venturi-device. FIG. 9 shows the slide in the operative position in which the opening in the housing of venturi-device 36 is located under opening 61.

In the present embodiment, a carrier rod 72 in the form of a ring is disposed against venturi-device 36, which carrier rod 72 supports the other discharge hose 38 of the venturi-device under the right discharge opening of machine (as seen in FIG. 1). Also, in the present embodiment, carrier rod is ring-shaped and discharge hose 38 is received through the ring. As a result, upon release of discharge opening 61, making use of the clearance or movability in discharge hose 38, the discharge hose of the neighboring discharge opening is moved out of the way, so that the space under metering device 34 remains available for disposing receptacle, such as a measuring cup or a bucket.

Furthermore, the present embodiment has the advantage that opening 61 can be exposed by the user in a simple manner in that handle 66 is or may be provided at a small distance from the front side of the machine and in that upon uncovering opening 61 at the venturi-device, one is not hampered by the gravity acting on the venturi-device and the supply and discharge hoses 37 and 38 connected thereto. This is of all the more importance since the venturi-device, because of its position under the hopper, will necessarily be relatively far from the user when said hopper is being maneuvered. Slide 65 has been designed to bear preferably with only four ridges 67 on guide strips 64, to reduce friction which may occur as a consequence of contamination of the strips, to a minimum and to counteract the occurrence of same in an effective manner during operation of the slide.

The invention is not restricted to the above disclosure, as such, but also relates to all details in the drawings, in particular to the components contributing to the invention. The invention further relates to alternatives in the construction which, of course, are within the scope of the following claims.

Having disclosed our invention, what we claim is new and to be secured by Letters Patent in the United States is:

1. An agricultural machine comprising an implement which includes coupling means for coupling said implement to a front lifting hitch of a tractor, said implement, for the purpose of being supported on the ground, comprising a roller connected with a frame, pivotal supporting means between the frame and the roller for providing a mutual pivoting movement about an axis oriented in the direction of the machine's normal direction of travel.

2. An agricultural machine as claimed in claim 1, wherein said pivotal supporting means comprises a real pivotal axis that defines said mutual pivoting movement.

3. An agricultural machine as claimed in claim 1, wherein said pivotal supporting means comprises front supporting means for supporting a front part of said implement, said front supporting means located between said roller and said frame in front of a transverse centerline of said roller as seen in plan, and at least one rear supporting means for supporting a rear part of said implement, said rear supporting means located behind said centerline.

4. An agricultural machine as claimed in claim 3 wherein said front supporting means and said rear supporting means each comprises a roller bearing.

5. An agricultural machine as claimed in claim 1 wherein said frame carries a guide face, said pivotal supporting means being movable within limits on said guide face.

6. An agricultural machine as claimed in claim 5 wherein said guide face comprises at least in part a U-profile.

7. An agricultural machine as claimed in claim 1 comprising a connection between said frame and said roller, said connection comprising a quadrangle hinge construction having substantially upwardly directed pivotal axes.

8. An agricultural machine as claimed in claim 7, comprising a guide face which is associated with said quadrangle hinge construction, said quadrangle hinge construction having two forward pivotal axes which lie within a substantially vertical plane extending transverse to the agricultural machine's normal direction of forward travel.

9. An agricultural machine as claimed in claim 8 wherein said quadrangle hinge construction comprises two arms converging in a forwardly direction, each arm intersecting with two of said upwardly directed pivotal axes.

10. An agricultural machine as claimed in claim 9 wherein said arms are inclined upwardly relative to the normal forward direction of movement of the agricultural machine.

11. An agricultural machine as claimed in claim 10 wherein said arms each comprise ball and socket joints where they intersect each said pivotal axes.

12. An agricultural machine as claimed in claim 7 comprising a hopper having an outlet, said outlet arranged forward of at least one of said pivotal axes.

13. An agricultural machine as claimed in claim 7, wherein said pivotal axes comprise a foremost pivotal axis and a rearmost pivotal axis, the foremost pivotal axis being disposed forward of said roller and the rearmost pivotal axis being arranged behind said roller as seen in plan.

14. An agricultural machine as claimed in claim 1 comprising a substantially triangular coupling trestle for said coupling to a front lifting hitch of a tractor, lower and upper arms mounted on said trestle, said lower and upper arms extending substantially horizontally in a forward direction relative to the normal operative travel of the agricultural machine, said upper and lower arms forming a connection of said coupling trestle with a forward framework comprising two transverse horizontal carriers interconnected by struts.

15. An agricultural machine as claimed in claim 1 wherein said roller comprises an axle and said pivoted supporting means comprises a transverse horizontal roller frame beam and arm portions extending from said frame beam, said arm portions connected with said axle of said roller, a support member on said frame beam and a pivot mechanism mounted on said support member disposed between said frame and said roller.

16. An agricultural machine as claimed in claim 1 wherein said roller comprises a central axle, roller segments mounted on said central axle, said pivotal supporting means which is provided between said frame and said roller comprising at least one arm portion extending between two of said roller segments towards said axle.

17. An agricultural machine as claimed in claim 1 wherein said pivotal supporting means comprises a pivot mechanism which comprises a U-shaped section, a bearing received in said U-shaped section, said bearing and said U-shaped section constructed and arranged so that said bearing travels, within limits within said U-shaped section, in a curved path, a quadrangle hinge construction defining said curved path, the movement of said bearing in said curved path being caused by mutual pivoting between said frame and said roller.

18. An agricultural machine as claimed in claim 17 comprising an additional U-shaped section, said two U-shaped sections facing each other and being disposed at substantially the same heights, a further bearing received in said further U-shaped section and a shaft interconnecting said two bearings, said shaft being interconnected to said roller to pivot therewith relative to said frame.

19. An agricultural machine in accordance with claim 1 comprising a hopper that contains granular material to be dispensed from said hopper, said hopper being carried by said frame.

20. An agricultural machine as claimed in claim 19, comprising a centrifugal air pump that pneumatically transports said granular material dispensed from said hopper, a drive shaft provided in the transverse center of said implement, an endless transmission element interconnecting said drive shaft and said centrifugal air pump.

21. An agricultural machine as claimed in claim 20, comprising a metering device for metering flow of the granular material dispensed from said hopper, said metering device connected to a venturi-device that mixes metered granular material with air flowing from said centrifugal air pump, said venturi-device being hingeably connected to said metering device for releasing an outlet of said metering device.

22. An agricultural machine as claimed in claim 20, comprising a metering device which meters said granular material dispensed from said hopper and a venturi-device for mixing the metered granular material with air flow produced by said centrifugal air pump, a sliding device between said metering device and said venturi-device for selectively changing at least part of said venturi-device from an operative position to an inoperative position for releasing, in the inoperative position, granular material flowing from said metering device.

23. An agricultural machine as claimed in claim 22 wherein said sliding device is provided with a handle on the front side of the agricultural machine.

24. An agricultural machine as claimed in claim 23 wherein said sliding device comprises a straight guide means that guides a slide in a forward direction in the agricultural machine to a place where an opening in said slide registers with a discharge opening from said metering device.

25. An agricultural machine as claimed in claim 24 wherein the length of said straight guide means is at least about double the length of said slide.

26. An agricultural machine as claimed in claim 22 comprising an air flow discharge conduit connected to a further metering device, a carrier interconnecting said conduit and said venturi-device for displacing said conduit together with at least part of said venturi-device when at least part of said venturi-device is displaced by said sliding device to prevent said conduit from obstructing a discharge opening which is provided under said metering device when said sliding device releases said discharge opening for the collection of granular material therefrom.

27. An agricultural machine which comprises a three-point hitch for connection to a tractor, a hopper supported by said three-point hitch, a ground engaging roller for treating the underlying soil connected to said three-point hitch between said three-point hitch and said hopper, the connection of said roller to said three-point hitch comprising a leg which is constructed and arranged so that said roller is rotatably coupled thereto at a lower aspect of said leg, a bearing support extending generally forwardly and horizontally mounted on an upper aspect of said leg so that said roller is tiltable within limits relative to said bearing support, at least one bearing joined with said bearing support, a U-shaped section receiving said bearing so that said bearing is disposed in said U-shaped section so as to be movable within limits generally horizontally and transversely relative to the normal forward direction of travel of the agricultural machine, said U-shaped section providing at least in part support for said hopper via said bearing and said roller.

28. An agricultural machine as claimed in claim 27 comprising a further bearing, said two bearings being joined by said bearing support, a further U-shaped section, said two U-shaped sections being disposed for receiving said bearings, said bearings disposed on opposite sides of a vertical plane which is transverse to the normal direction of travel of the agricultural machine and which contains the axis of rotation of said roller.

29. An agricultural machine as claimed in claim 27 comprising means for broadcasting granular material carried by said hopper, said means for broadcasting being mounted on said hopper.

30. An agricultural machine as claimed in claim 27 comprising a further leg whereby there are two of said legs, said roller having an axle, each of said legs rotatably receiving said axle on opposite lateral aspects of said roller whereby said legs are on opposite sides of a vertical plane extending through the center of said roller in the direction of normal travel of the agricultural machine, levers pivotally interconnected to said legs and said U-shaped sections, said levers converging in the direction of operative travel of the agricultural machine.

31. An agricultural machine which comprises a three-point hitch for connection to a tractor, a ground engaging roller for treating the underlying soil connected to said three point hitch, the connection of said roller to said three-point hitch comprising a leg which is constructed and arranged so that said roller is rotatably coupled thereto at a lower aspect of said leg, a bearing support extending generally forwardly and horizontally mounted at an upper aspect of said leg so that said roller is tiltable within limits relative to said bearing support, at least one bearing joined with said bearing support, slide means receiving said bearing so that said bearing is slidably retained on said slide means to move generally horizontally and transversely relative to a normal of travel of the agricultural machine.

32. An agricultural machine as claimed in claim 31 comprising a further bearing so that there are at least two bearings joined by said bearing support and a further sliding means so that there are at least two sliding means being provided for receiving said bearings, said bearings disposed on opposite sides of a vertical plane extending transverse to the normal direction of travel of an agricultural machine and containing the axis of rotation of said roller.

33. An agricultural machine as claimed in claim 32 comprising a hopper and means for broadcasting granular material carried by said hopper, said means for broadcasting being mounted on said hopper.

34. An agricultural machine as claimed in claim 32 comprising a further leg so that there are two of said legs, said roller including an axle, each of said legs rotatably receiving said axle on opposite sides of said roller whereby said legs are on opposite sides of a vertical plane extending through the center of said roller in the normal direction of travel of the agricultural machine, levers pivotally interconnected to said legs and said sliding means, said levers converging in the normal direction of travel of the agricultural machine.

35. An agricultural machine comprising an implement for coupling to a front lifting hitch of a tractor, said implement comprising a roller connected with a frame, pivotal supporting means between the frame and the roller for providing a mutual pivoting movement about an axis oriented in the direction of the machine's normal direction of travel, a connection being provided between said frame and said roller, said connection comprising a quadrangle hinge construction having substantially upwardly directed pivotal axes.

36. An agricultural machine as claimed in claim 35, comprising a guide face which is associated with said quadrangle hinge construction, said quadrangle hinge construction having two forward pivotal axes which lie within a substantially vertical plane extending transverse to the agricultural machine's normal direction of travel.

37. An agricultural machine as claimed in claim 36, wherein said quadrangle hinge construction comprises two arms converging in a forwardly direction each, arm intersecting with two of said upwardly directed pivotal axes.

38. An agricultural machine as claimed in claim 37, wherein said arms are inclined upwardly relative to the normal forward direction of travel of the agricultural machine.

39. An agricultural machine as claimed in claim 38, wherein said arms each comprise ball and socket joints where they intersect said pivotal axes.

40. An agricultural machine as claimed in claim 35, comprising a hopper having an outlet, said outlet arranged forward of at least one of said pivotal axes.

41. An agricultural machine as claimed in claim 35, wherein said pivotal axes comprise a foremost pivotal axis and a rearmost pivotal axis, said foremost pivotal axis disposed forward of said roller and said rearmost pivotal axis arranged behind said roller as seen in plan.

42. An agricultural machine comprising an implement for coupling to a front lifting hitch of a tractor, said implement, for the purpose of being supported on the ground, comprising a roller connected with a frame, pivotal supporting means between the frame and the roller for providing a mutual pivoting movement about an axis oriented in the direction of the machine's normal direction of travel, a substantially triangular coupling trestle for said coupling to a front hitch of a tractor, lower and upper arms mounted on said trestle, said lower and upper arms extending substantially horizontally in a forward direction relative to the machine's normal direction of travel, said lower and upper arms forming a connection of said coupling trestle with a forward framework comprising two transverse horizontal carriers interconnected by struts.

43. An agricultural machine comprising an implement for coupling to a front lifting hitch of a tractor, said implement, for the purpose of being supported on the ground, comprising a roller connected with a frame, pivotal supporting means between the frame and the roller for providing a mutual pivoting movement about an axis oriented in the direction of the machine's normal direction of travel, said roller comprising an axle and said pivotal supporting means comprising a transverse horizontal roller frame beam and arm portions extending from said frame beam, said arm portions connected with said axle of said roller, a support member on said frame beam and a pivot mechanism mounted on said support member disposed between said frame and said roller.

44. A agricultural machine comprising an implement for coupling to a front lifting hitch of a tractor, said implement, for the purpose of being supported on the ground, comprising a roller connected with a frame, pivotal supporting means between the frame and the roller for providing a mutual pivoting movement about an axis which is oriented in the direction of the machine's normal direction of travel, said roller comprising a central axle, roller segments mounted on said central axle, said pivotal supporting means which is provided between said frame and said roller comprising at least one arm portion extending between two of said roller segments towards said axle.

45. An agricultural machine comprising an implement for coupling to a front lifting hitch of a tractor, said implement, for the purpose of being supported on the ground, comprising a roller connected with a frame, pivotal supporting means between the frame and the roller for providing a mutual pivoting movement about an axis which is at least oriented in the direction of the machine's normal direction of travel, said pivotal supporting means comprising a pivot mechanism which comprises a U-shaped section, a bearing received in said U-shaped section, said bearing and said U-shaped section constructed and arranged so that said bearing travels, within limits within said U-shaped section, in a curved path, a quadrangle hinge construction defining said curved path, the movement of said bearing in said curved path being caused by mutual pivoting between said frame and said roller.

46. An agricultural machine in accordance with claim 45, comprising an additional U-shaped section, said two U-shaped sections facing each other and being disposed at substantially the same heights, a further bearing received in said further U-shaped section and a shaft interconnecting said two bearings, said shaft being interconnected to said roller to pivot therewith relative to said frame.

47. An agricultural machine comprising an implement for coupling to a front lifting hitch of a tractor, said implement, for the purpose of being supported on the ground, comprising a roller that is connected with a frame, pivotal supporting means between said frame and said roller for providing a mutual pivoting movement about an axis which is at least oriented in the direction of the machine's normal direction of travel, the machine further comprising a hopper that contains granular material to be dispensed from said hopper, said hopper being carried by said frame, a centrifugal air pump that pneumatically transports said granular material dispensed from said hopper, a drive shaft provided in the transverse center of said implement, an endless transmission element interconnecting said drive shaft and said centrifugal air pump.

48. An agricultural machine in accordance with claim 47, comprising a metering device for metering flow of the granular material dispensed from said hopper, said metering device connected to a venturi-device that mixes metered granular material with air flowing from said centrifugal air pump, said venturi-device being hingeably connected to said metering device for releasing an outlet of said metering device.

49. An agricultural machine in accordance with claim 47, comprising a metering device which meters said granular material dispensed from said hopper in a venturi-device for mixing the metered granular material with air flow produced by said centrifugal air pump, a sliding device between said metering device and said venturi-device for selectively changing at least part of said venturi-device from an operative position to an inoperative position for releasing, in the inoperative position, granular material flowing from said metering device.

50. An agricultural machine in accordance with claim 49, wherein said sliding device is provided with a handle on a front side if the agricultural machine.

51. An agricultural machine in accordance with claim 50, wherein said sliding device comprises a straight guide means that guides a slide in a forward direction in the agricultural machine to a place wherein an opening in said slide registers with a discharge opening in said metering device.

52. An agricultural machine in accordance with claim 51, wherein the length of said straight guide means is about double the length of said slide.

53. An agricultural machine in accordance with claim 49, comprising an air flow discharge conduit connected to a further metering device, a carrier interconnecting said conduit and said venturi-device for displacing said conduit together with at least part of said venturi-device when at least part of said venturi-device is displaced by said sliding device to prevent said conduit from obstructing a discharge opening which is provided under said metering device when said sliding device releases said discharge opening for the collection of granular material therefrom.

* * * * *